United States Patent
Yoon

(10) Patent No.: US 8,599,917 B2
(45) Date of Patent: Dec. 3, 2013

(54) APPARATUS AND METHOD FOR RECEIVING STREAMING DATA IN A PORTABLE TERMINAL

(75) Inventor: Dae-Eui Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 13/041,670

(22) Filed: Mar. 7, 2011

(65) Prior Publication Data

US 2011/0216702 A1    Sep. 8, 2011

(30) Foreign Application Priority Data

Mar. 8, 2010    (KR) ........................ 10-2010-0020552

(51) Int. Cl.
*H04N 7/12*    (2006.01)
*H04N 11/02*   (2006.01)
*H04N 11/04*   (2006.01)

(52) U.S. Cl.
USPC ....... 375/240.01; 375/224; 370/259; 370/328

(58) Field of Classification Search
None
See application file for complete search history.

(56) References Cited

U.S. PATENT DOCUMENTS

| | | | |
|---|---|---|---|
| 2004/0109667 A1* | 6/2004 | Matsuda et al. | 386/37 |
| 2006/0109385 A1* | 5/2006 | Wakako et al. | 348/731 |
| 2007/0263982 A1* | 11/2007 | Hasegawa et al. | 386/95 |
| 2011/0216702 A1* | 9/2011 | Yoon | 370/328 |

* cited by examiner

*Primary Examiner* — Jae Y Lee
(74) *Attorney, Agent, or Firm* — Jefferson IP Law, LLP

(57) ABSTRACT

An apparatus and method for receiving streaming data in a portable terminal are provided. The apparatus includes a controller and an Intra-frame (I-frame) manager. The controller decodes and reproduces received streaming data. In a case of a stopping of a streaming service, the I-frame manager stores information on a stopped position of the streaming service and, in a case where the stopped streaming service is reattempted, reproducing the streaming data from the stopped position of the streaming service.

20 Claims, 6 Drawing Sheets

APPARATUS AND METHOD FOR RECEIVING STREAMING DATA IN A PORTABLE TERMINAL

PRIORITY

This application claims the benefit under 35 U.S.C. §119 (a) of a Korean patent application filed in the Korean Intellectual Property Office on Mar. 8, 2010 and assigned Serial No. 10-2010-0020552, the entire disclosure of which is hereby incorporated by reference.

BACKGROUND OF THE INVENTION

1. Field of the Invention

The present invention relates to an apparatus and method for receiving streaming data in a mobile communication system. More particularly, the present invention relates to an apparatus and method for reproducing streaming data from a stop time point in a case where a streaming service being viewed is stopped according to a network state (i.e., a state where a portable terminal performs handover, a state where the portable terminal enters a shadow area, or a state where the portable terminal uses a Multi-Radio Access Bearer (Multi-RAB), or other network states interrupting viewing of the streaming service).

2. Description of the Related Art

In recent years, portable terminals, a necessity to contemporary society, have become widely used. Service providers and system manufacturers are competitively developing products (or services) for the differentiation from other enterprises.

For example, the portable terminals evolve into multimedia equipment to provide services for a phone book, a game, a Short Message Service (SMS), an electronic (e)-mail, a voice call, a Motion Picture Expert Group (MPEG)-1 or MPEG-2 Audio Layer 3 (MP3) player, a schedule management function, a digital camera, Multimedia Message Service (MMS), a wireless Internet services, and other similar products and services.

Recently, Wireless Fidelity (WiFi) terminals having Wireless Local Area Network (WLAN) functions are available in the market and thus can have wireless access to an electronic mail, the Web, a streaming media and the like. That is, WiFi wirelessly provides a broadband Internet access to users and thus, allow a user rapid, simple and convenient online access in a home, in an office and also while the WiFi terminal is moving.

The streaming media represents a technology capable of processing transmitted data like a seamless and continuous flow of water. The streaming media technology is becoming increasingly significant with the growth of the Internet. This is because most users do not have fast internet access so as to immediately download large-sized multimedia files. If using the streaming technology, a client browser or a plug-in can begin displaying streaming data before an entirety of the streaming data files are transmitted.

Recently, due to an increased availability of a $3^{rd}$ Generation/High Speed Downlink Packet Access (3G/HSDPA) networks, high speed data services can be provided to users of the 3G/HSDPA networks. Due to this, the users can be provided with the streaming service without great inconvenience or delay in the streaming service.

When using the streaming service, the portable terminal receives User Datagram Protocol (UDP) packets delivered by a streaming server, decodes the UDP packets, and outputs both audio and video data simultaneously.

The streaming service can be disconnected or ended according to a network state (e.g., handover, weak coverage, multi-Radio Access Bearer (RAB), no service and the like).

As one example, in a case where a situation corresponding to the above network state happens while a user of the portable terminal views the streaming service, the streaming service will be stopped and, accordingly, the portable terminal will reattempt reproduction of the audio and video data, or other streaming data.

However, in the above case, a release of socket connection for the streaming service occurs, and thus, there is an inconvenience that the portable terminal should be provided with the streaming data from a beginning of the streaming data. Thus, the portable terminal will reproduce the streaming data from the beginning or a user may search for a stopped reproduction position in order to maintain a continuous streaming service.

Accordingly, in order to address the above problem, there is a need for an apparatus and method for determining information on a stop time point and, at resumption of the streaming service, reproducing the streaming data from the stop time point in the portable terminal.

SUMMARY OF THE INVENTION

An aspect of the present invention is to address at least the above-mentioned problems and/or disadvantages and to provide at least the advantages below. Accordingly, one aspect of the present invention is to provide an apparatus and method for determining a position in which a streaming service is stopped in a portable terminal.

Another aspect of the present invention is to provide an apparatus and method for storing an Intra-frame (I-frame) existing at a stop time point when a streaming service is stopped in a portable terminal.

A further aspect of the present invention is to provide an apparatus and method for, at a resumption of the streaming service, reproducing an I-frame stored at the stop time point and providing a continuous streaming service in a portable terminal.

The above aspects are addressed by providing an apparatus and method for receiving streaming data in a portable terminal.

In accordance with an aspect of the present invention, an apparatus for receiving streaming data in a portable terminal is provided. The apparatus includes a controller and an Intra-frame (I-frame) manager. The controller decodes and reproduces received streaming data. In a case where a situation of a stopping of a streaming service happens, the I-frame manager stores information on a stopped position of the stopped streaming service and, in a case where the stopped streaming service is reattempted, reproducing the streaming data from the stopped position of the stopped streaming service.

In accordance with another aspect of the present invention, a method for receiving streaming data in a portable terminal is provided. The method includes decoding and reproducing received streaming data, upon a stopping of a streaming service of the streaming data, storing information on a stopped position of the streaming service, and, upon reattempting streaming of the stopped streaming service, reproducing the streaming data from the stopped position of the streaming service.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
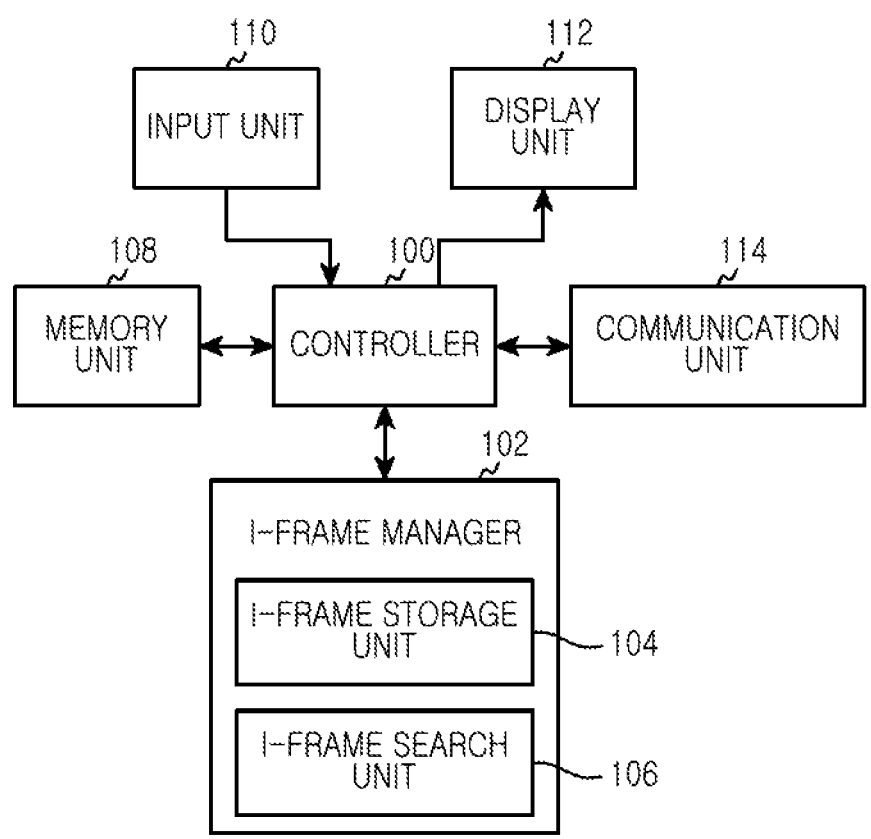
FIG. 1 is a block diagram illustrating a portable terminal providing a continuous streaming service according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and method for storing an Intra-frame (I-frame) existing at a time point when a streaming service is stopped, or in other words, a stop time point of the streaming service, and determining a position in which the streaming service is stopped and, at a resumption of the streaming service, reproducing the I-frame stored at the stop time point and providing a continuous streaming service in a portable terminal.

FIGS. 1 through 6, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a block diagram illustrating a portable terminal providing a continuous streaming service according to an exemplary embodiment of the present invention.

Referring to FIG. 1, the portable terminal can include a controller 100, an I-frame manager 102, a memory unit 108, an input unit 110, a display unit 112, and a communication unit 114. The I-frame manager 102 includes an I-frame storage unit 104 and an I-frame search unit 106. However, the portable terminal may include additional units that are not illustrated here merely for sake of clarity. Similarly, the functionality of two or more of the above noted units may be integrated into a single component.

The controller 100 of the portable terminal controls a general operation of the portable terminal. For example, the controller 100 performs processing and control for voice calls and data communication, and performs processes providing a streaming service by decoding and reproducing received streaming data. In addition, the controller 100 resumes the streaming service from a stop time point of the streaming service, which is an end of reproduction, and enables a continuous streaming service in a case where the controller 100 resumes the streaming service after the streaming service is stopped (i.e., a case where the portable terminal performs handover, a case where the portable terminal enters a shadow area, a case where the portable terminal uses a multi-RAB or other similar cases disrupting the streaming service).

In other words, in a case where a stopping of the streaming service happens in the course of providing the streaming service, the controller 100 has the I-frame manager 102 determine and store a position (i.e., the position being an I-frame transmitted by a streaming server) of a stopping of reproduction of the streaming data.

Accordingly, in a case where the controller 100 resumes the stopped streaming service, the controller 100 searches for the stored position of the stopping of the reproduction of the streaming data, which is the stop time point, and reproduces the streaming data from the stop time point, thus enabling continuous data reproduction.

The I-frame manager 102 determines and stores a position of the stop time point of the streaming service under the control of the controller 100. In a case where the I-frame manager 102 resumes the stopped streaming service, the I-frame manager 102 searches the stored position of the stop time point of the reproduction of the streaming data and reproduces the streaming data from the stop time point.

In a case where the I-frame storage unit 104 of the I-frame manager 102 determines that the streaming service is stopped by the I-frame manager 102, the I-frame storage unit 104 stores a position of the stop time point of the reproduction of the streaming data, by storing a timestamp of an I-frame that is a close distance from a current frame among I-frames existing in a streaming buffer.

Also, in a case where the I-frame search unit 106 determines that resumption of the stopped streaming service is occurring under the control of the I-frame manager 102, the I-frame search unit 106 searches for a position of the stored timestamp of the I-frame and reproduces the streaming data from the position of the stored timestamp.

The memory unit 108 includes a Read Only Memory (ROM), a Random Access Memory (RAM), a flash ROM, or other similar storage devices. The ROM stores a microcode of a program for processing and controlling the controller 100 and the I-frame manager 102 and a variety of kinds of reference data.

The RAM, which is a working memory of the controller 100, stores temporary data generated during execution of a variety of kinds of programs. The flash ROM stores a diversity of kinds of updateable depository data such as a phone book, an outgoing message, an incoming message, and other similar data.

The input unit 110 includes numeral key buttons '0' to '9', a menu button, a cancel button, an OK button, a talk button, an end button, an Internet button, navigation key buttons, and a plurality of function keys such as a character input key and other similar input keys and buttons. The input unit 110 provides key input data, corresponding to a key pressed by a user, to the controller 100.

The display unit 112 displays state information generated during an operation of the portable terminal, and also displays characters, a large amount of moving pictures and still pictures and other similar displayable data and information. The display unit 112 can be a color Liquid Crystal Display (LCD), an Active Mode Organic Light Emitting Diode (AMOLED) display, and other similar display apparatuses. In a case where the display unit 112 includes a touch input device and the portable terminal includes a touch input scheme, the display unit 112 may be used as an input device of the portable terminal.

The communication unit 114 performs transmitting/receiving and processing of a radio signal of data inputted/outputted through an antenna (not illustrated). For example, in a transmission mode, the communication unit 114 processes original data through channel coding and spreading, converting the original data into a Radio Frequency (RF) signal, and transmitting the RF signal. In a reception mode, the communication unit 114 converts a received RF signal into a baseband signal, processes the baseband signal through de-spreading and channel decoding, and restores the signal to original data.

Operations and functions of the I-frame manager 102 may be implemented by the controller 100 of the portable terminal. However, these elements are separately formed and separately shown in FIG. 1 as an exemplary embodiment for description convenience. However, aspects of the present invention are not limited thereto, and these elements may be formed together or separately in various similar embodiments. It shall be able to be understood by those skilled in the art that various modifications can be made within the scope of the present invention. For example, construction can be also such that all of functions and operations are processed in the controller 100.

Figure 2:
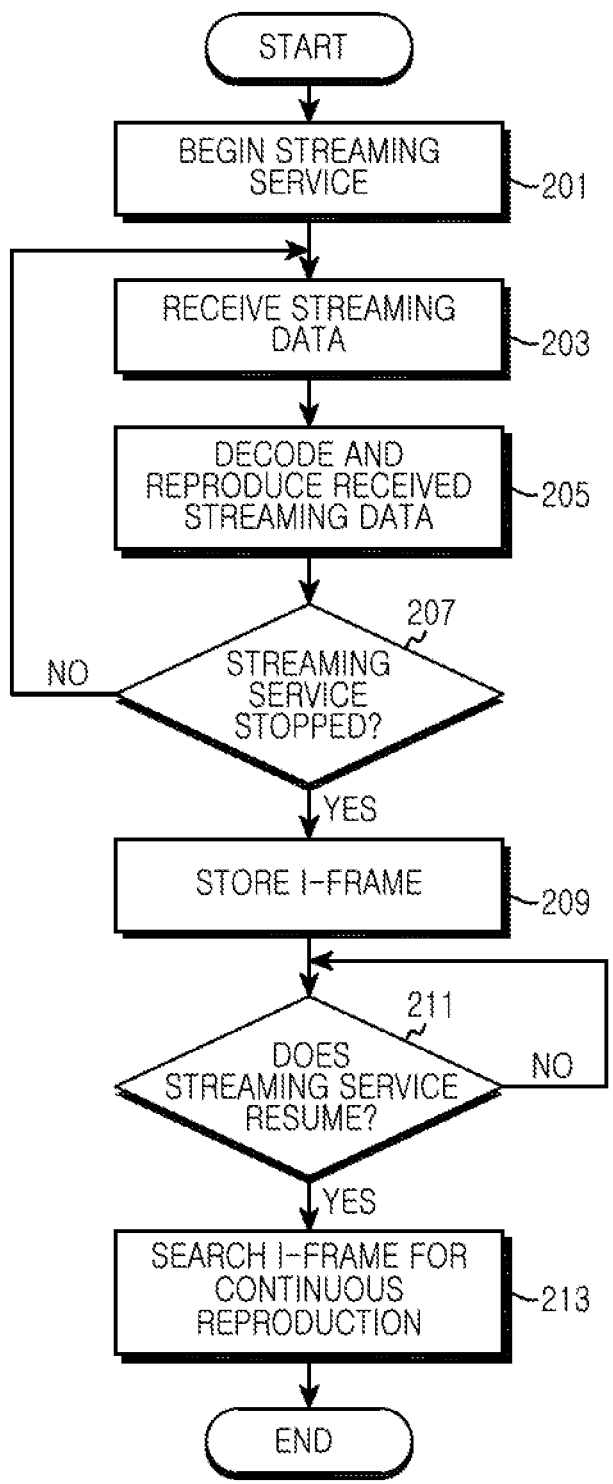
FIG. 2 is a flowchart illustrating a process of, after a stopping of the streaming service, providing a continuous streaming service in a portable terminal according to an exemplary embodiment of the present invention.

FIG. 2 is a flowchart illustrating a process of, after a stopping of the streaming service, providing a continuous streaming service in a portable terminal according to an exemplary embodiment of the present invention.

Referring to FIG. 2, after beginning a streaming service in step 201, the portable terminal proceeds to step 203 and receives streaming data. In step 203, the portable terminal performs a Transmission Control Protocol (TCP)-based socket connection to a Real Time Streaming Protocol (RTSP) server and sequentially sends Option/Setup/Describe/Play messages to the RTSP server. Accordingly, the RTSP server transmits User Datagram Protocol (UDP)-based streaming data to the portable terminal.

The portable terminal then proceeds to step 205 to decode and reproduce streaming data received from the RTSP server. Then, the portable terminal proceeds to step 207 and determines if a streaming service has been stopped.

The stopping of the streaming service can be a case where the portable terminal performs a handover, a case where the portable terminal enters a shadow area, and a case where the portable terminal uses a multi-RAB or other similar cases disrupting the streaming service.

If the stopping of the streaming service does not happen in step 207, then the portable terminal again performs the operation of step 203.

On the other hand, in step 207, if the portable terminal determines that the streaming service has been stopped, then the portable terminal proceeds to step 209 and stores an I-frame. The portable terminal stores the I-frame in order to determine a position of the stopping of the streaming service, and the procedure is described below in detail with reference to FIG. 3.

After that, the portable terminal proceeds to step 211 and determines whether to resume the stopped streaming service.

If it is determined that the stopped streaming service is not resumed in step 211, the portable terminal again performs the procedure of step 211.

On the other hand, if it is determined that the stopped streaming service is resumed in step 211, the portable terminal proceeds to step 213 and determines the stored I-frame and searches for an I-frame for continuous reproduction. In step 211, in order to reproduce the streaming data from the stop time point of the streaming service, the portable terminal searches for an I-frame stored at the stop time point when the streaming service stopped. The process is described below in detail with reference to FIG. 4.

After step 213, the portable terminal terminates the process according to the exemplary embodiment of the present invention.

Figure 3:
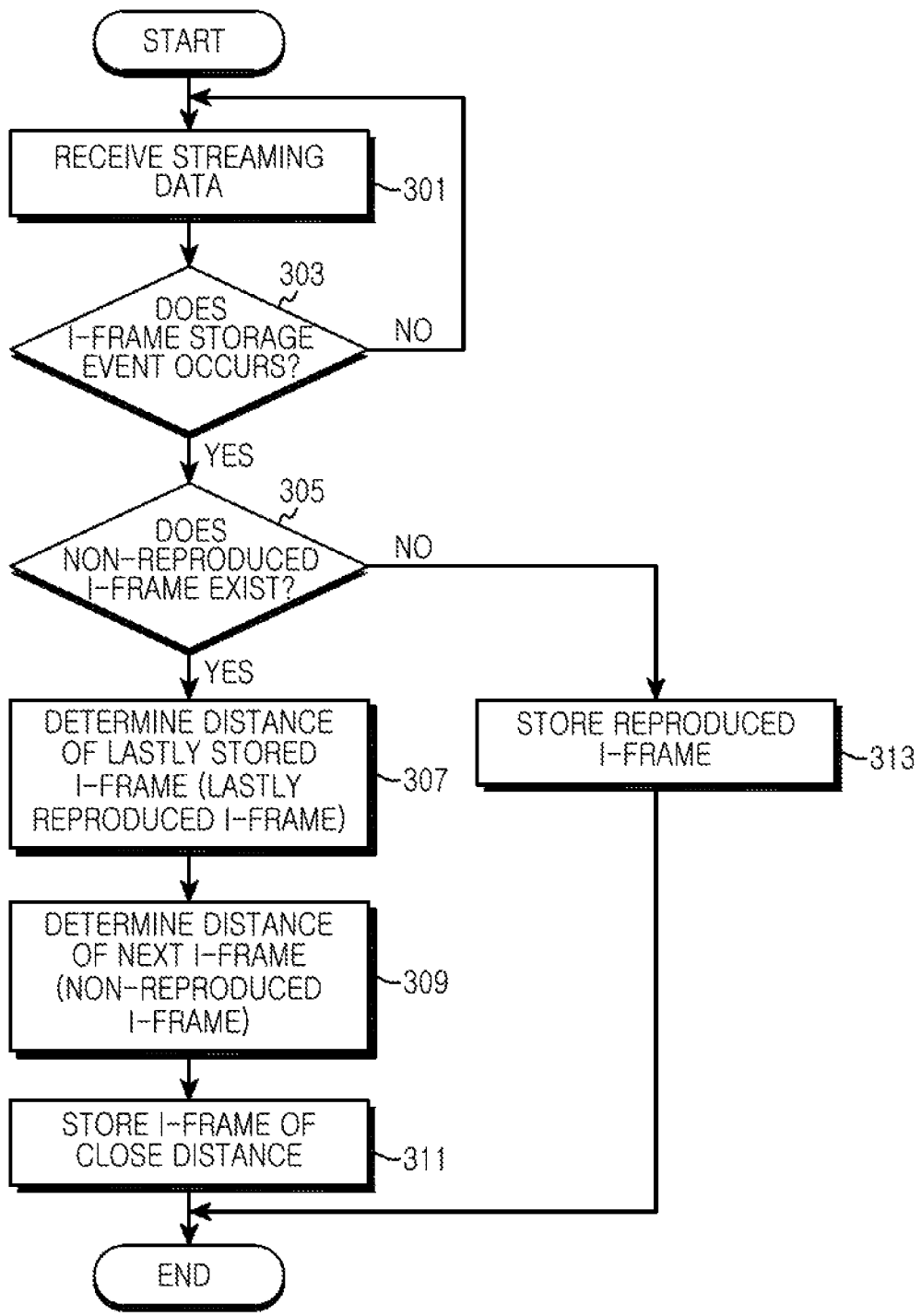
FIG. 3 is a flowchart illustrating a process of storing an Intra-frame (I-frame) corresponding to a stop time point of a streaming service in a portable terminal according to an exemplary embodiment of the present invention.

FIG. 3 is a flowchart illustrating a process of storing an I-frame corresponding to a stop time point of a streaming service in a portable terminal according to an exemplary embodiment of the present invention.

Referring to FIG. 3, the portable terminal can store the I-frame at the occurrence of a stopping of a streaming service (i.e., a case where the portable terminal performs handover, a case where the portable terminal enters a shadow area, a case where the portable terminal uses a multi-RAB and other similar cases where a streaming service is stopped) or upon a user's request. Here, the I-frame is stored in order to determine a position for continuously using a streaming service stopped by a user of the portable terminal.

To store the I-frame as described above, the portable terminal receives streaming data in step 301 and determines if an I-frame storage event takes place in step 303. The I-frame storage event occurs when a stopping of the streaming service happens according to a network state, or a user's I-frame storage request occurs.

If the I-frame storage event does not take place in step 303, the portable terminal again performs the process of step 301.

On the other hand, if the I-frame storage event takes place in step 303, the portable terminal proceeds to step 305 and determines if a non-reproduced I-frame exists among the received streaming data. Here, the non-reproduced I-frame refers to an I-frame received after a lastly reproduced I-frame from among I-frames stored in a streaming buffer.

If determining that the non-reproduced I-frame among the received streaming data does not exist in step 305, the portable terminal proceeds to step 313 and stores a reproduced I-frame. The storing of the reproduced I-frame, as described above, can occur when a power source suddenly turns off while the portable terminal is using a streaming service.

On the other hand, if determining that the non-reproduced I-frame among the received streaming data exists in step 305, the portable terminal proceeds to step 307 and determines a distance between a lastly stored I-frame (i.e., a lastly reproduced I-frame) and a current frame.

Next, the portable terminal proceeds to step 309 and determines a distance between the non-reproduced I-frame (i.e., the next I-frame) and the current frame. That is, in a case where, in the course of receiving streaming data composed of a Predict-frame (P-frame) and an I-frame, the portable terminal intends to store the I-frame, the portable terminal determines a distance between a timestamp of a current P-frame and a timestamp of a lastly stored I-frame, and determines a distance between the timestamp of the current P-frame and a timestamp of a next I-frame (i.e., a non-reproduced I-frame).

After that, the portable terminal proceeds to step 311 and determines and stores an I-frame of a close distance from the current frame. At this time, the portable terminal stores a host name, a file name, and I-frame position information.

Next, the portable terminal terminates the process according to the present exemplary embodiment of the present invention.

Figure 4:
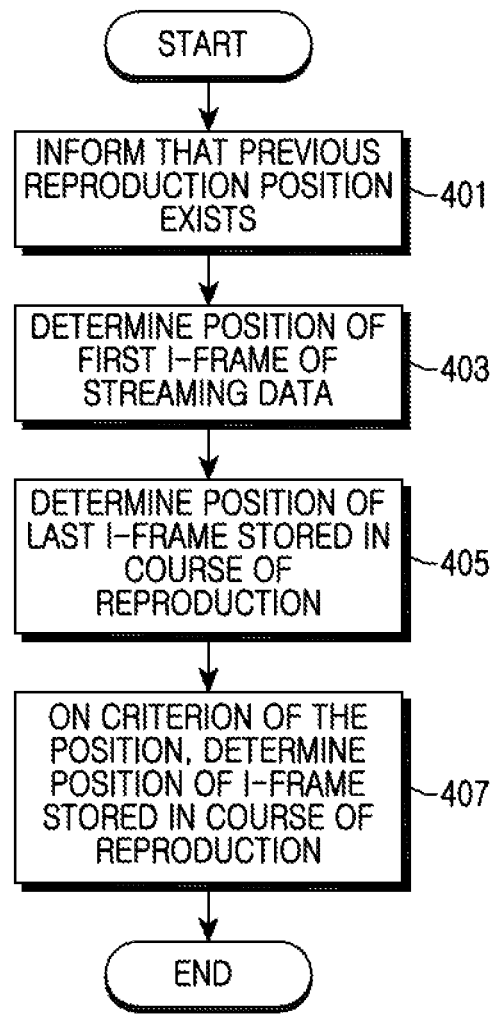
FIG. 4 is a flowchart illustrating a process of searching an I-frame corresponding to a stop time point of a streaming service in a portable terminal according to an exemplary embodiment of the present invention.

FIG. 4 is a flowchart illustrating a process of searching an I-frame corresponding to a stop time point of a streaming service in a portable terminal according to an exemplary embodiment of the present invention.

Referring to FIG. 4, the portable terminal assumes that, after a streaming service being viewed is stopped according to a network state (i.e., handover, weak coverage, multi-RAB, no service and the like), the streaming service is resumed.

The portable terminal can determine that an I-frame stored according to the stopping of the streaming service exists, and can determine that viewing of the stopped streaming service is being reattempted, i.e., determining that portable terminal is receiving streaming data from a server having a same host name as a host name of a server streaming data before the stopping of the streaming service.

After determining that reattempting the streaming service is occurring, the portable terminal proceeds to step 401 and outputs a pop-up message to determine whether to reproduce streaming data from a previous reproduction position and then, in a case where a user initiates reproducing the streaming data from the previous reproduction position, the portable terminal proceeds to step 403 to determine a position of a first I-frame of the streaming data. After the portable terminal receives and stores the first I-frame of the streaming data while receiving the streaming data, the portable terminal uses the position of the stored first I-frame as a criterion for determining a position of an I-frame stored at the stopping of the streaming service.

Next, the portable terminal proceeds to step 405 and determines a position of a last I-frame stored in the course of reproduction and then, in step 407, determines the position of the last I-frame stored in the course of reproduction, on a criterion of the position of the first I-frame of the streaming data.

Regarding the determining of the position of the last frame using the position of the first I-frame, the portable terminal stores the position of the first I-frame because a change of a start value of a position of a first I-frame after a session end can make it impossible to search an exact position of a last I-frame stored in course of reproduction.

That is, in order to search for a position of a stopping of the reproduction, the portable terminal determines a timestamp of a first I-frame and adds a timestamp of the last I-frame to the timestamp of the first I-frame, thus reproducing an I-frame corresponding to a position of the stopping of the streaming service.

Due to this, the portable terminal can shift a reproduction position from a timestamp of a first I-frame to a timestamp of an I-frame corresponding to a position of the stopping of the streaming service. At a time when the portable terminal sends play packets, the portable terminal transmits the clip's time (e.g., Range: normal play time (npt)=6.000000-) to a header. However, in order to find and access an I-frame having an accurate position, the portable terminal shifts to a reproduction position using the timestamp and reproduces a corresponding I-frame from the reproduction position, thereby preventing picture breaks.

After that, the portable terminal terminates the process according to the exemplary embodiment of the present invention.

FIG. 5 is a diagram illustrating a process of storing an I-frame according to a network state in a portable terminal according to an exemplary embodiment of the present invention.

Figure 5A:
FIG. 5A is a diagram illustrating an I-frame storing process of a portable terminal in which a power off situation happens according to an exemplary embodiment of the present invention.

FIG. 5A is a diagram illustrating an I-frame storing process of a portable terminal in which a power off situation happens according to an exemplary embodiment of the present invention.

Referring to FIG. 5A, the power off situation occurs when a streaming service is suddenly stopped due to circumstances unexpected by a user. The power off situation includes a situation where the portable terminal moves to a no service area or a situation of power off resulting from faulty operation of the portable terminal.

Since the power off is a situation where packet services cannot be guaranteed, the portable terminal of the power off situation stores a last I-frame 500 (i.e., an I-frame stored prior to a data reproduction time point 502) from among the received streaming data in a streaming buffer.

Figure 5B:
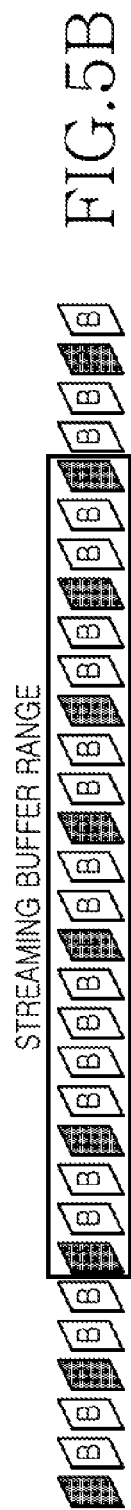
FIG. 5B is a diagram illustrating an I-frame storing process of a portable terminal in which a handover situation happens according to an exemplary embodiment of the present invention.

FIG. 5B is a diagram illustrating an I-frame storing process of a portable terminal in which a handover situation happens according to an exemplary embodiment of the present invention.

Referring to FIG. 5B, the portable terminal should store an I-frame in preparation for a service provider supporting a streaming service only in a 3rd Generation (3G) network, a service provider having no 2nd Generation (2G) network/3G network and thus using a network of a different service provider, or a case of not being capable of temporarily receiving packet data because it is in a circuit data mode.

If call connection is ended while the portable terminal performs handover, the portable terminal stores a last I-frame 510 (i.e., an I-frame stored prior to a data reproduction time point 512) from among the received streaming data in a streaming buffer.

Figure 5C:
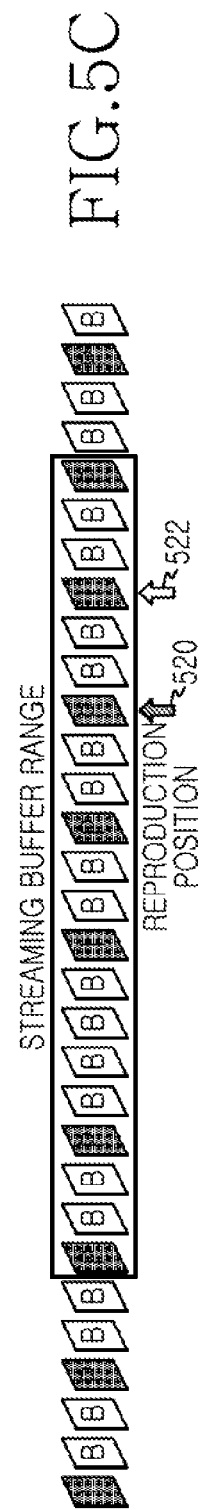
FIG. 5C is a diagram illustrating an I-frame storing process of a portable terminal in which a handover situation happens according to another exemplary embodiment of the present invention.

FIG. 5C is a diagram illustrating an I-frame storing process of a portable terminal in which a handover situation happens according to another exemplary embodiment of the present invention.

Referring to FIG. 5C, in a case where the portable terminal performs a normal handover process, the portable terminal compares a distance between a current frame 520 and a last I-frame with a distance between the current frame 520 and an I-frame 522 not reproduced among I-frames stored in a streaming buffer and, after that, stores an I-frame of a close distance.

Figure 5D:
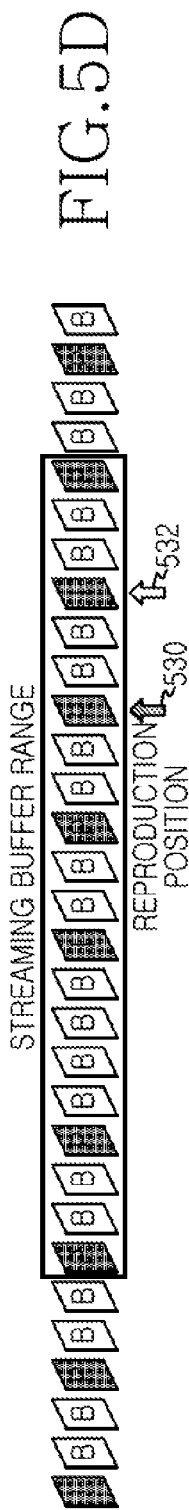
FIG. 5D is a diagram illustrating an I-frame storing process of a portable terminal located in a weak electric field according to an exemplary embodiment of the present invention.

FIG. 5D is a diagram illustrating an I-frame storing process of a portable terminal located in a weak electric field according to an exemplary embodiment of the present invention.

Referring to FIG. 5D, in a case where the portable terminal determines that it enters a weak electric field, because a strength of a received signal becomes less than a threshold value, the portable terminal stores a position of an I-frame, thereby addressing a problem of a failure to search for the position of the I-frame according to sudden call connection.

Accordingly, the portable terminal compares a distance between a current frame 530 and a last I-frame with a distance between the current frame 530 and an I-frame 532 not reproduced among I-frames stored in a streaming buffer and, after that, stores an I-frame of a close distance.

Figure 5E:
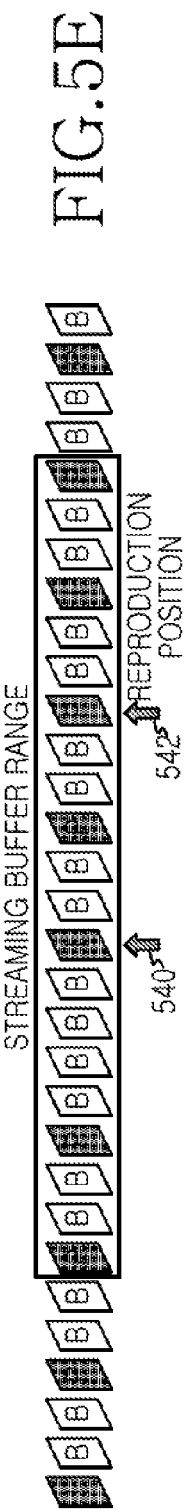
FIG. 5E is a diagram illustrating an I-frame storing process of a portable terminal in which a non-use of a multi-Radio Access Bearer (multi-RAB) happens according to an exemplary embodiment of the present invention.

FIG. 5E is a diagram illustrating an I-frame storing process of a portable terminal in which a non-use of a multi-RAB happens according to an exemplary embodiment of the present invention.

Referring to FIG. 5E, in a case where call reception takes place in the course of a streaming service, the portable terminal enters an idle state.

At this time, in a case where a call time (i.e., a call reception time) is equal to or greater than a session timeout (i.e., a time when session connection is ended), a session is released from a server providing a streaming service. In such cases, the portable terminal stores a last I-frame 540 (i.e., an I-frame stored prior to a data reproduction time point 542) from among the received streaming data in a streaming buffer.

Figure 6:
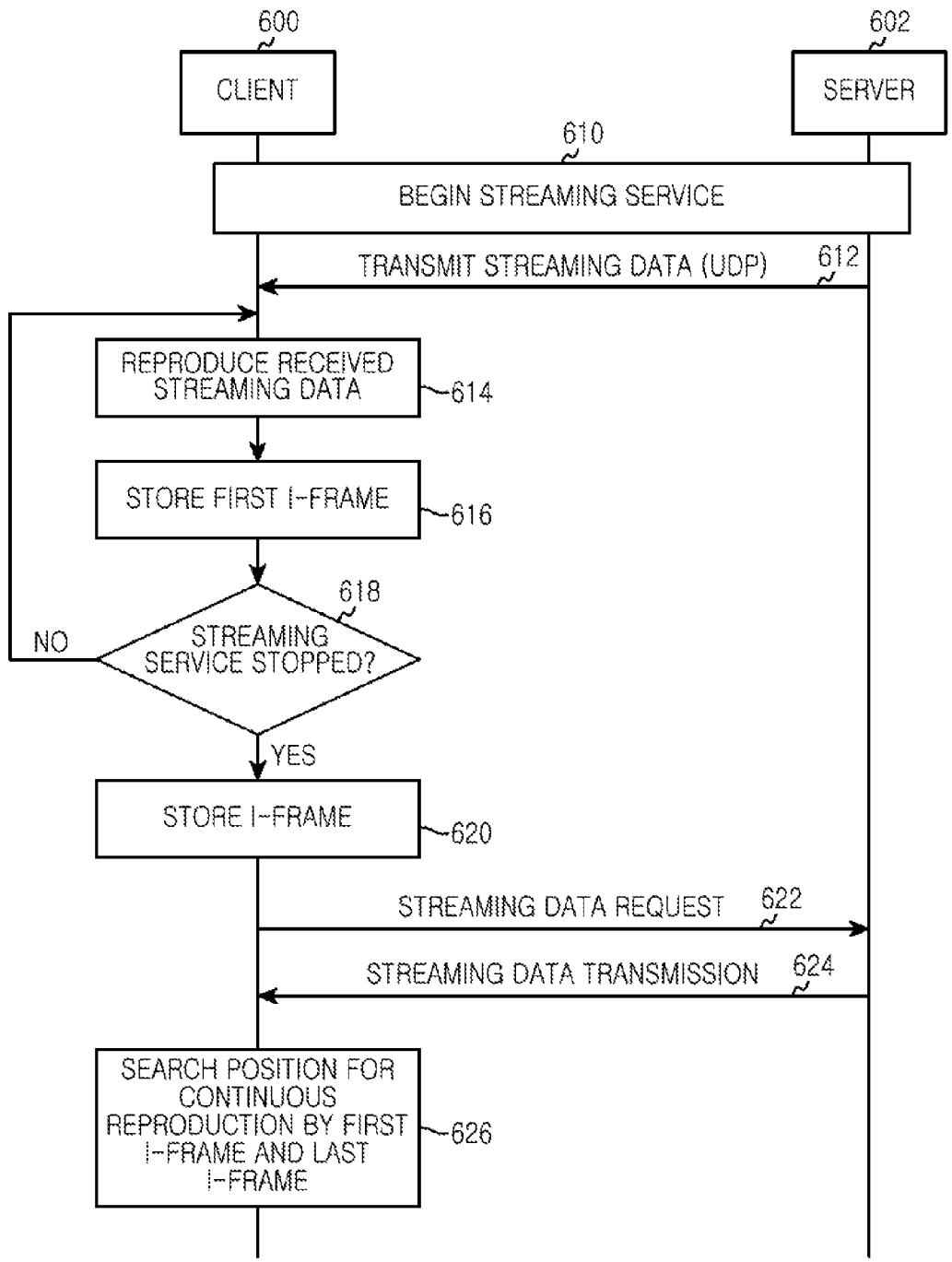
FIG. 6 is a flowchart illustrating a process of providing a streaming service in a mobile communication system according to an exemplary embodiment of the present invention.

FIG. 6 is a flowchart illustrating a process of providing a streaming service in a mobile communication system according to an exemplary embodiment of the present invention.

Referring to FIG. 6, the mobile communication system can include a client 600 receiving the streaming service and a server 602 providing the streaming service.

In step 610, the client 600 and the server 602 begin the streaming service by performing TCP-based socket connection.

Accordingly, in step 612, the server 602 transmits UDP-based streaming data to the client 600 and, in step 614, the client 600 decodes and reproduces the streaming data received from the server 602. After that, in step 616, the client 600 determines a position of a first I-frame in the received streaming having P-frames and I-frames and stores the first I-frame.

If the streaming service is not stopped in step 618, the client 600 returns to step 614 and again performs a process of decoding and reproducing the received streaming data. If a situation of a stopping of the streaming service happens in step 618, the client 600 proceeds to step 620 and stores a timestamp of an I-frame corresponding to a time point when the streaming service is stopped, i.e., stores a timestamp of a lastly reproduced I-frame.

If the client 600 intends to send a request for streaming data to the server 602 in order to resume the stopped streaming service and sends the request in step 622, in response to the request, the server 602 transmits the streaming data to the client 600 in step 624.

The client 600 receiving the streaming data reproduces the streaming data from the beginning, or a user presses a search button to shift to a desired position, in order to continuously use or reproduce the stopped streaming service.

However, according to the present exemplary embodiment of the present invention, in step 626, the client 600 searches for a position for continuous reproduction using a timestamp position of the first I-frame and a timestamp position of the last I-frame, and reproduces the streaming data from a stopped time point.

As described above, exemplary embodiments of the present invention relate to an apparatus and method for, at a resumption of the streaming service, providing a continuous streaming service in a portable terminal. The exemplary embodiments of the present invention store an I-frame existing at a time point when a streaming service is stopped, determine a position of a stopping of the streaming service, and, at the resumption of the streaming service, reproduce the I-frame stored at the stop time point, thereby being capable of overcoming a problem of, at the resumption of the streaming service, having to reproduce streaming data from the beginning or having to search for a desired position using a specific key in a portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for receiving streaming data in a portable terminal, the apparatus comprising:
   a controller configured to decode and reproduce received streaming data; and
   an Intra-frame (I-frame) manager configured to, when a stopping of a streaming service of the streaming data happens, store information on a stopped position of the streaming service and, in a case where the stopped streaming service is reattempted, reproduce the streaming data from the stopped position of the streaming service, wherein the I-frame manager determines, with respect to a current frame, a distance between a timestamp of a lastly reproduced I-frame and a timestamp of a next I-frame to be reproduced.

2. The apparatus of claim 1, wherein the I-frame manager stores the information on the stopped position by determining an I-frame stored in a streaming buffer; and stores, with respect to the current frame, a position of a timestamp of an I-frame located a short distance from the current frame.

3. The apparatus of claim 1, wherein, if a call connection is ended, the I-frame manager stores the information on the stopped position by storing a lastly reproduced I-frame from among received I-frames in a streaming buffer.

4. The apparatus of claim 1, wherein the I-frame manager determines a timestamp of a first I-frame of the streaming data and a position of a timestamp of an I-frame corresponding to the stopped position of the streaming service and then, on the criterion of the position, determines a position of an I-frame intended to be reproduced.

5. The apparatus of claim 4, wherein the I-frame manager determines the position of the I-frame intended to be reproduced by adding the timestamp of the I-frame corresponding to the stopped position of the streaming service to the timestamp of the first I-frame.

6. The apparatus of claim 4, wherein the timestamp of the first I-frame becomes a criterion of determining a position of an I-frame stored at a time of the stopping of the streaming service.

7. The apparatus of claim 1, wherein the I-frame manager stores the information on the stopped position upon the stopping of the streaming service or upon a user's request to stop the streaming service.

8. The apparatus of claim 1, wherein the stopping of the streaming service comprises at least one of the portable terminal performing a handover, the portable terminal entering an area having a weak signal, and the portable terminal using a multi-Radio Access Bearer (multi-RAB).

9. The apparatus of claim 8, wherein upon the portable terminal performing the handover, the portable terminal compares a distance between a current frame and a last I-frame stored in a streaming buffer of the streaming data and stores an I-frame having a close distance to the current frame.

10. The apparatus of claim 8, wherein upon the portable terminal entering the area having the weak signal, the portable terminal compares a distance between a current frame and a last I-frame to a distance between the current frame and an I-frame not reproduced from among I-frames stored in a streaming buffer and I-frames stored in a streaming buffer and stores the I-frame having a shorter distance to the current frame.

11. A method for receiving streaming data in a portable terminal, the method comprising:

decoding and reproducing received streaming data;

upon a stopping of a streaming service of the streaming data, storing information on a stopped position of the streaming service; and upon reattempting streaming of the stopped streaming service, reproducing the streaming data from the stopped position of the streaming service, wherein the storing of the information on the stopped position comprises determining, with respect to a current frame, a distance between a timestamp of a lastly reproduced I-frame and a timestamp of a next I-frame to be reproduced.

12. The method of claim 11, wherein the storing of the information on the stopped position further comprises:

determining an Intra-frame (I-frame) stored in a streaming buffer; and storing, with respect to the current frame, a position of a timestamp of an I-frame located a short distance from the current frame.

13. The method of claim 11, wherein the storing of the information on the stopped position comprises, if call connection is ended, storing a lastly reproduced I-frame among received I-frames in a streaming buffer.

14. The method of claim 11, wherein the reproducing of the streaming data from the stopped position comprises:

determining a timestamp of a first I-frame of the streaming data;

determining a timestamp of an I-frame corresponding to a position of the stopping of the streaming service; and determining, with respect to the timestamp of the I-frame, a position of an I-frame intended to be reproduced.

15. The method of claim 14, wherein the determining of the position of the I-frame intended to be reproduced comprises adding the timestamp of the I-frame corresponding to the position of the stopping of the streaming service to the timestamp of the first I-frame.

16. The method of claim 14, wherein the timestamp of the first I-frame is a criterion of determining a position of an I-frame stored at a time when the streaming service is stopped.

17. The method of claim 11, wherein the storing of the information on the stopped position is performed upon the stopping of the streaming service or upon a user's request.

18. The method of claim 11, wherein the stopping of the streaming service comprises at least one of the portable terminal performing handover, the portable terminal entering an area having a weak signal, and the portable terminal using a multi-Radio Access Bearer (multi-RAB).

19. The method of claim 18, wherein upon the portable terminal performing the handover, the portable terminal compares a distance between a current frame and a last I-frame stored in a streaming buffer of the streaming data and stores an I-frame having a close distance to the current frame.

20. The method of claim 18, wherein upon the portable terminal entering the area having the weak signal, the portable terminal compares a distance between a current frame and a last I-frame to a distance between the current frame and an I-frame not reproduced from among I-frames stored in a streaming buffer and I-frames stored in a streaming buffer and stores the I-frame having a shorter distance to the current frame.

* * * * *